US012115829B2

(12) United States Patent
Barber et al.

(10) Patent No.: US 12,115,829 B2
(45) Date of Patent: Oct. 15, 2024

(54) COMPACT VEHICLE SUSPENSION SYSTEM

(71) Applicant: Multimatic Inc., Markham (CA)

(72) Inventors: Michael Charles Martin Barber, Mount Market (AU); Daniel James Gebbing, Edithvale (AU)

(73) Assignee: MULTIMATIC INC., Markham (CA)

( * ) Notice: Subject to any disclaimer, the term of this patent is extended or adjusted under 35 U.S.C. 154(b) by 0 days.

(21) Appl. No.: 18/272,716

(22) PCT Filed: Jan. 27, 2022

(86) PCT No.: PCT/US2022/014033
§ 371 (c)(1),
(2) Date: Jul. 17, 2023

(87) PCT Pub. No.: WO2022/164987
PCT Pub. Date: Aug. 4, 2022

(65) Prior Publication Data
US 2024/0300272 A1     Sep. 12, 2024

Related U.S. Application Data

(60) Provisional application No. 63/142,149, filed on Jan. 27, 2021.

(51) Int. Cl.
*B60G 3/01* (2006.01)
*B60G 3/06* (2006.01)

(52) U.S. Cl.
CPC .............. *B60G 3/01* (2013.01); *B60G 3/06* (2013.01); *B60G 2204/4232* (2013.01); *B60G 2204/43* (2013.01); *B60G 2206/50* (2013.01)

(58) Field of Classification Search
CPC ........................ B60G 3/01; B60G 2204/4232
See application file for complete search history.

(56) References Cited

U.S. PATENT DOCUMENTS 2,125,511 A  *  8/1938  Martins ................. B60G 3/01
                                                      267/249
3,333,653 A     8/1967  Eirhart, Jr.
(Continued)

FOREIGN PATENT DOCUMENTS

DE     1170257 B     5/1964
DE     7027784 U     1/1972
(Continued)

OTHER PUBLICATIONS

International Search Report and Written Opinion for International Application No. PCT/US2022/014033 mailed May 10, 2022.
(Continued)

*Primary Examiner* — Nicole T Verley
(74) *Attorney, Agent, or Firm* — Carlson, Gaskey & Olds, P.C.

(57) ABSTRACT

A compact vehicle suspension system comprises a sliding ride motion guide having a fixed guide portion and a telescoping guide portion telescopically movable relative to one another. The sliding ride motion guide is fixed to a wheel hub knuckle via the fixed guide portion and is rotatably and structurally fixed via the telescoping guide portion at a top mount to a vehicle body. A coil over shock absorber is rotatably connected to a lower control arm at a first end and to the vehicle body at a second end. Arms of the fixed guide portion of the sliding ride motion guide may span the wheel hub knuckle to which a drive shaft may be connected. Vertical motion of the wheel is defined by a sliding axis of the sliding ride motion guide and an arc of the lower control arm.

20 Claims, 7 Drawing Sheets

(56) References Cited

U.S. PATENT DOCUMENTS

| | | | | |
|---|---|---|---|---|
| 5,597,171 A | * | 1/1997 | Lee | B62D 17/00 |
| | | | | 280/124.138 |
| 11,370,262 B2 | * | 6/2022 | Weiss | B62D 9/02 |
| 2006/0208448 A1 | * | 9/2006 | Dundon | B60G 21/0551 |
| | | | | 280/124.152 |
| 2007/0120333 A1 | * | 5/2007 | Bushko | B60G 3/01 |
| | | | | 280/124.145 |
| 2009/0194965 A1 | * | 8/2009 | Boston | B60G 3/20 |
| | | | | 280/124.136 |

FOREIGN PATENT DOCUMENTS

| | | | | |
|---|---|---|---|---|
| DE | 19940527 A1 | | 4/2001 | |
| DE | 102008045384 A1 | | 3/2010 | |
| DE | 102012204105 A1 | * | 9/2013 | B60G 15/06 |
| DE | 102017218719 A1 | * | 4/2019 | B60G 13/005 |
| EP | 0374504 A2 | * | 6/1990 | |
| EP | 0878378 A1 | * | 11/1998 | |
| EP | 1526011 A1 | * | 4/2005 | B60G 11/04 |
| FR | 1237255 A | | 7/1960 | |
| FR | 2849406 A1 | * | 7/2004 | B60G 3/01 |
| FR | 2880302 A1 | * | 7/2006 | B60G 3/01 |
| JP | 2007062498 A | * | 3/2007 | B60G 3/01 |
| JP | 2009174916 A | * | 8/2009 | |
| KR | 0180365 B1 | | 3/1999 | |
| KR | 100207104 B1 | * | 7/1999 | |
| WO | WO-2005000606 A1 | * | 1/2005 | B60G 21/007 |
| WO | WO-2007020498 A1 | * | 2/2007 | B60G 15/062 |
| WO | WO-2007026198 A1 | * | 3/2007 | B60G 3/01 |
| WO | WO-2008155591 A1 | * | 12/2008 | B60G 11/14 |
| WO | WO-2017021906 A1 | * | 2/2017 | B60G 15/06 |

OTHER PUBLICATIONS

International Preliminary Report on Patentability for International Application No. PCT/US2022/014033 mailed Mar. 16, 2023.

* cited by examiner

COMPACT VEHICLE SUSPENSION SYSTEM

CROSS-REFERENCE TO RELATED APPLICATIONS

This application claims priority to U.S. Provisional Application No. 63/142,149 filed on Jan. 27, 2021, and is incorporated herein by reference.

BACKGROUND

This invention relates to a compact vehicle suspension system and to a compact vehicle suspension and wheel system which provide advantages over a conventional MacPherson strut.

A vehicle suspension system performs the function of isolating the vehicle from road surface irregularities and enabling manoeuvrability of the vehicle. There are several requirements of a suspension system. It must maintain the relationship between the wheel and the vehicle structure such that road generated forces, including vertical, lateral and fore/aft forces, are transmitted to control the vehicle trajectory as desired by the driver and with performance meeting contemporary expectations. It must both provide vertical compliance and damp the vertical motion of the vehicle body and wheels. It must resolve vehicle system generated forces such as brake torque (tractive thrust) and camber torque (cornering thrust). It will preferably provide for a driveshaft and for steering articulation. Preferably, it will provide an acceptable packaging volume.

The MacPherson strut has been a very popular solution for vehicle suspension systems for many years. It is relatively simple and inexpensive. In contrast to a double wishbone suspension system, the MacPherson strut system eliminates an upper control arm. This allows for more width in the engine compartment which is particularly beneficial for smaller vehicles with transverse-mounted engines, such as most front wheel drive vehicles. It provides a relatively simple method to set suspension geometry.

A MacPherson strut typically carries both a coil spring, on which the vehicle body is suspended, and a shock absorber. The coil spring is mounted coaxially over the shock absorber, with the combined part known as a coil over shock absorber. The piston and rod of the shock absorber must be robust since they form part of the strut and bear the brake torque and camber torque resulting from cornering thrust. Indeed, the rod portion of the shock absorber extends upwardly to a mounting on the vehicle body and forms a structural connection between the unsprung mass of the vehicle and the sprung mass. The MacPherson strut typically uses a single wishbone control arm (L-arm) which serves as a mounting point for the hub carrier or axle of the vehicle wheel. This lower control arm configuration provides both lateral and longitudinal location of the wheel. The L-arm delivers good lateral suspension stiffness, which is beneficial for vehicle dynamic behaviour, and wheel recession, when obstacles such as road surface expansion joints are encountered, to improve vehicle ride. The upper part of the hub carrier is rigidly fixed to the bottom of the strut. The line from the strut's top mount to the bottom ball joint on the control arm provides the steering axis. The axis of the strut may be inwardly angled from the steering axis to clear the tire. With this set-up, the bottom of the strut follows an arc while the vehicle is steered.

MacPherson struts provide significant structural support to the vehicle. In many vehicles, however, the location of the top mount is adjacent (i.e. just beneath) the hood which limits the crash crumple zone desirable for pedestrian impact protection. They also tend to require a significant amount of space above the wheel to package the spring. MacPherson struts tend to exhibit significant spindle length where the center of the steering axis is offset from the center of the front wheel contact patch resulting in undesirable torque steer and brake shudder sensitivity. The spindle length is directly related to the scrub radius which is the distance between the steering axis and the tire centerline at the contact patch.

Accordingly, it would be beneficial to have a suspension system which provides some of the advantages of the MacPherson strut, such as the use of a single L-shaped control arm, while decreasing torque steer and brake shudder sensitivity. It would be useful to manage brake torque and camber torque resulting from cornering thrust in a similar way to that of a MacPherson strut. A favorable spindle length would provide more stable braking and decrease or eliminate torque steer. Furthermore, it would be advantageous to allow the caster angle to be set independently from the suspension geometry. This would allow a steering geometry that provides steer angle dependant camber gain, aiding in cornering grip and providing a favourable on-center steering feel. It would also be useful to provide a suspension system with a lighter weight shock absorber, allowing more latitude in shock absorber design, by eliminating its function as part of a structural strut. Above all, it would be useful to have a more compact suspension design that performed acceptably when compared with other contemporary designs but created opportunities for alternative vehicle packaging, crash structure efficiency and exterior styling.

SUMMARY

It has been found that by separating the functions of the shock absorber and the strut in a suspension system, a more favorable suspension geometry may be achieved. This configuration provides for compact, and particularly low height, design while delivering the desired vertical articulation. It provides the benefits set out above. It is applicable to vehicles with conventional wheel sizes as well as conventional brakes, wheel bearings and steering systems. Also it is adaptable to wheels with or without a driveshaft.

In a principal aspect of the invention, a compact vehicle suspension system comprises a sliding ride motion guide, a lower control arm, and means to control rotation of the sliding ride motion guide about a rotational axis. The sliding ride motion guide comprises a fixed guide portion and a telescoping guide portion which moves in a telescoping manner in relation to the fixed guide portion. The sliding ride motion guide is adapted to be fixed to a wheel hub knuckle via the fixed guide portion and to be rotatably and structurally fixed via the telescoping guide portion at a top mount to a vehicle body to bear a brake torque resulting from vehicle braking and a camber torque resulting from vehicle cornering thrust.

In a further aspect of the compact vehicle suspension system, a coil over shock absorber is rotatably connected to the lower control arm at a first end and to the vehicle body at a second end to bear a weight of the vehicle.

In a further aspect of the compact vehicle suspension system, the means to control rotation of the sliding ride motion guide about a rotational axis comprises an anti-roll bar connected to the fixed guide portion of the sliding ride motion guide and to the vehicle body.

In a further aspect of the compact vehicle suspension system, the means to control rotation of the sliding ride motion guide about a rotational axis comprises a link connected to the fixed guide portion of the sliding ride motion guide and to the lower control arm.

In a further aspect of the compact vehicle suspension system, the means to control rotation of the sliding ride motion guide about a rotational axis comprises a link connected to the fixed guide portion of the sliding ride motion guide and to the vehicle body.

In a further aspect of the compact vehicle suspension system, arms of the fixed guide portion of the sliding ride motion guide span the wheel hub knuckle.

In a further aspect of the compact vehicle suspension system, the wheel hub knuckle is integral with the sliding ride motion guide.

In a further aspect of the compact vehicle suspension system, vertical motion of the wheel is defined by a sliding axis of the sliding ride motion guide and an arc of the lower control arm.

In a further principal aspect of the invention, a compact vehicle suspension and wheel system comprises a wheel, a wheel hub knuckle, a sliding ride motion guide, a lower control arm, a coil over shock absorber and means to control rotation of the sliding ride motion guide about a rotational axis. The sliding ride motion guide comprises a fixed guide portion and a telescoping guide portion which moves in a telescoping manner in relation to the fixed guide portion. The sliding ride motion guide is rotatably fixed to the wheel hub knuckle via the fixed guide portion and is rotatably and structurally fixed via the telescoping guide portion at a top mount to a vehicle body to bear a brake torque and a camber torque resulting from a cornering thrust. The coil over shock absorber is rotatably connected to the lower control arm at a first end and to the vehicle body at a second end to bear a weight of the vehicle.

In a further aspect of the compact vehicle suspension and wheel system, the means to control rotation of the sliding ride motion guide about a rotational axis comprises an anti-roll bar connected to the fixed guide portion of the sliding ride motion guide and to the vehicle body.

In a further aspect of the compact vehicle suspension and wheel system, the means to control rotation of the sliding ride motion guide about a rotational axis comprises a link connected to the fixed guide portion of the sliding ride motion guide and to the lower control arm.

In a further aspect of the compact vehicle suspension and wheel system, the means to control rotation of the sliding ride motion guide about a rotational axis comprises a link connected to the fixed guide portion of the sliding ride motion guide and to the vehicle body.

In a further aspect of the compact vehicle suspension and wheel system, arms of the fixed guide portion of the sliding ride motion guide span the wheel hub knuckle.

In a further aspect of the compact vehicle suspension and wheel system, the wheel hub knuckle is integral with the sliding ride motion guide.

In a further aspect of the compact vehicle suspension and wheel system, vertical motion of the wheel is defined by a sliding axis of the sliding ride motion guide and an arc of the lower control arm.

With the use of the sliding ride motion guide to provide the structural connection between the sprung mass and the unsprung mass of the vehicle, a separate coil over shock absorber may be mounted compactly in the vehicle. The coil over shock absorber is mounted to the lower control arm at one end, and to the vehicle body at a second end.

By separating the suspension geometry structural elements of the vehicle from the spring and shock absorber, a more compact vehicle suspension is achieved. The sliding ride motion guide is connected to the steered wheel hub knuckle and the steering geometry is determined by the pivot axis of the wheel hub knuckle. This leads to a short spindle length which avoids torque and brake steer. Furthermore the pivot axis of the wheel hub knuckle furnishes a caster angle that provides a steer angle dependant camber gain, which is advantageous for cornering grip. Preferably, the ride motion guide housing has a robust span across the wheel hub knuckle and the shaft, or telescoping guide portion, has a robust span within the guide housing to transmit these loads to the body structure of the vehicle via the top mount, thus providing good brake and camber stiffness. Since the more compact coil over shock absorber can be fitted in a smaller volume, more crushable space is provided under the hood of the vehicle. Since the orientation of the coil over shock absorber is disconnected from the steering axis, it can be mounted at any desired angle to optimize packaging of the suspension system within the available space. An anti-roll bar is favorably connected to the portion of the sliding ride motion guide fixed to the wheel hub knuckle to control rotation of the motion guide. This is optimal when the suspension system is mounted at a front wheel in a front wheel drive vehicle. Alternatively, a link connecting the sliding ride motion guide and the control arm may perform this function. Additionally, a tie rod may be provided to transmit force from a steering rack to the steering knuckle.

A simpler configuration without a separate steered wheel hub knuckle may be suitable for certain rear suspension applications. Beyond the benefits of the invention over standard McPherson struts, such a configuration provides certain of the beneficial characteristics of multi-link suspension kinematics, including wheel center recession and it may be configured to provide roll understeer, a desirable behaviour for most vehicles.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 6:
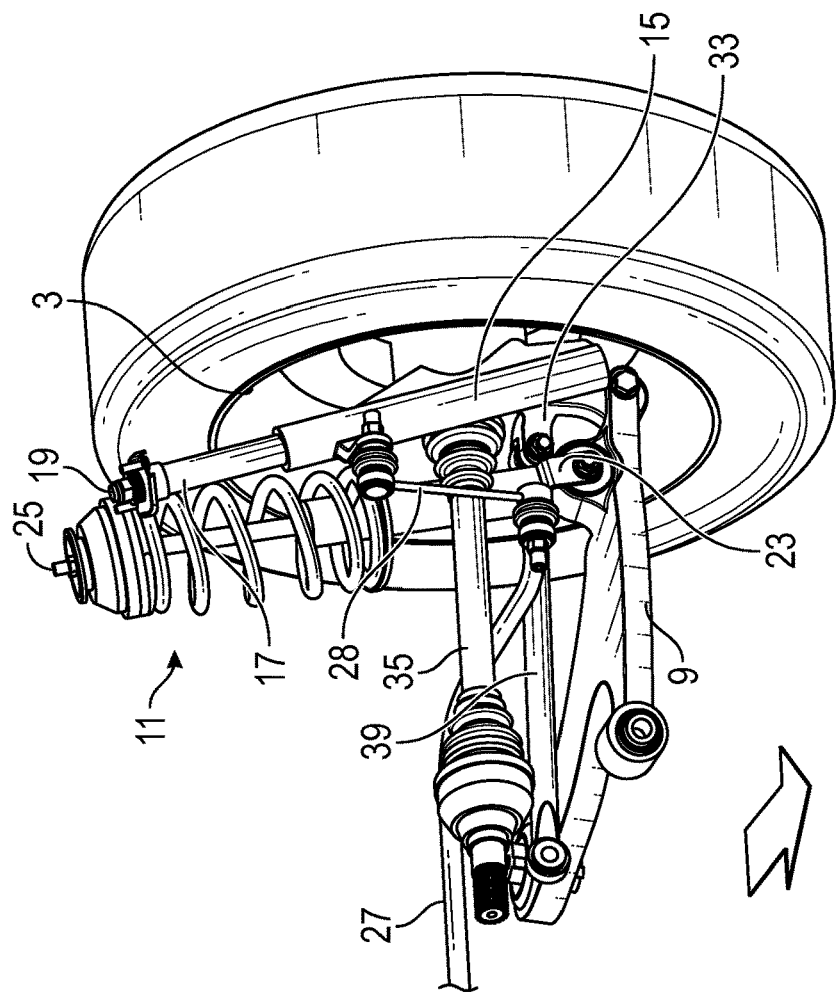
FIG. 6 is a perspective view of a rear compact vehicle suspension system mounted to a wheel.
Figure 5:
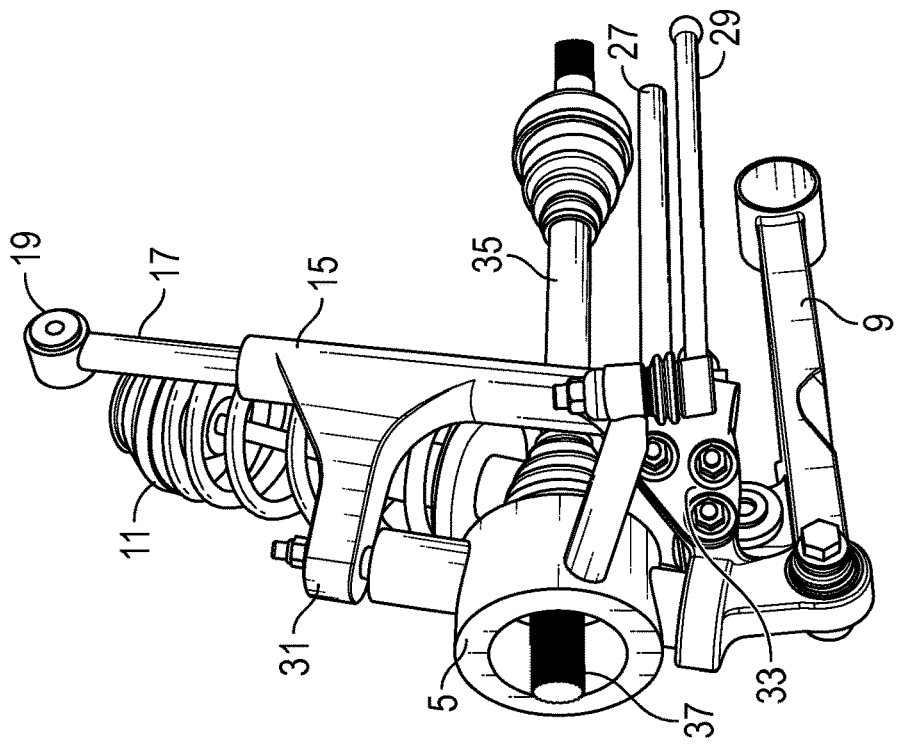
FIG. 5 is a perspective, isolated view of a compact vehicle suspension system.

The compact vehicle suspension system is illustrated separate from and with a wheel, the latter of which comprises the compact vehicle suspension and wheel system. FIGS. 1 to 5, 7A, 8A and 8B relate generally to a front mounted suspension system and a front mounted suspension and wheel system. FIGS. 6 and 8B relate generally to a rear mounted suspension system and a rear mounted suspension and wheel system.

A compact vehicle suspension system 1 is mounted to a vehicle (not illustrated). Typically, when mounted at a front wheel, the suspension system is mounted below a hood (not illustrated). When the suspension system 1 is mounted at a rear wheel, there is no hood but simply a portion of the body of the vehicle which covers the suspension system. A typical motor vehicle comprises four wheels. Typically, the compact vehicle suspension system is mounted at either both front wheels or both rear wheels, although it may be mounted at all four wheels.

The compact vehicle suspension system 1 is mounted between the vehicle body and a wheel 3. FIGS. 1 to 5 illustrate the compact vehicle suspension system 1 as generally mounted at a front wheel. On a typical front wheel, there is a wheel hub assembly between the drive axle and the brake drums or discs. On the brake disc side, the wheel is attached to the bolts of the wheel hub assembly. On the drive axle side, the hub assembly is mounted to the steering knuckle as a bolt-on or press-in assembly.

Figure 1:
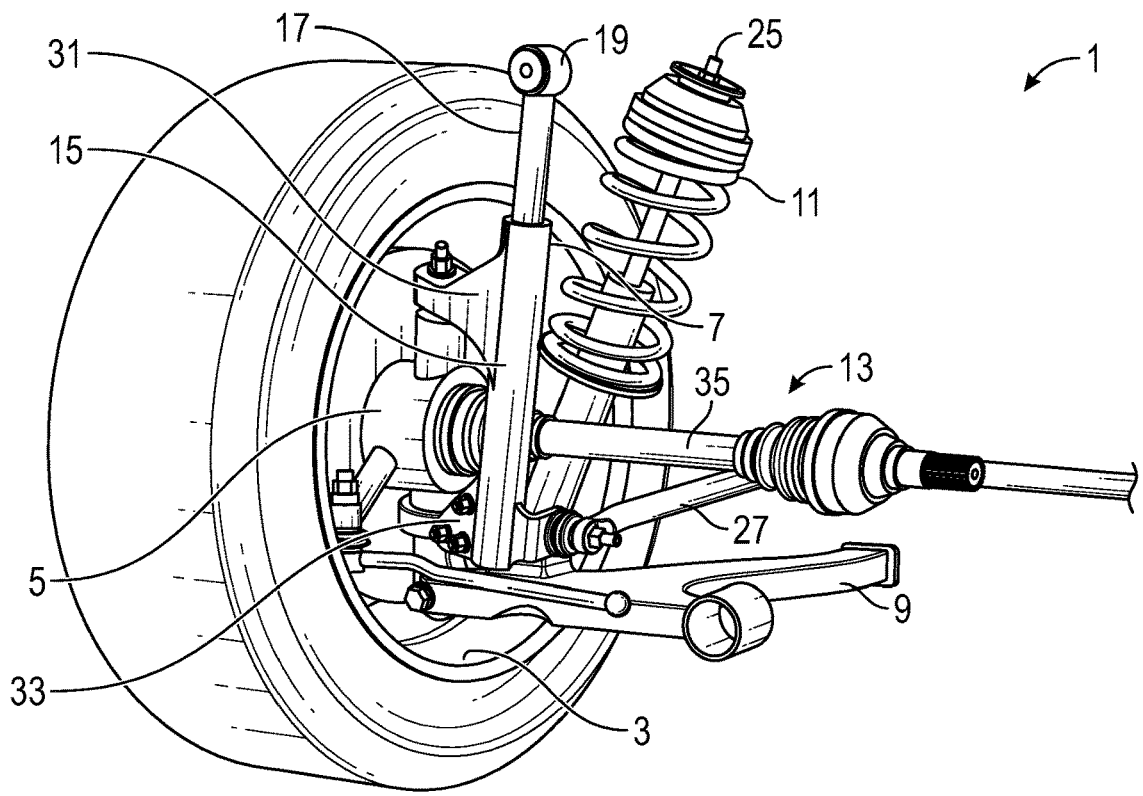
FIG. 1 is a perspective view of a compact vehicle suspension system mounted to a wheel.
Figure 2:
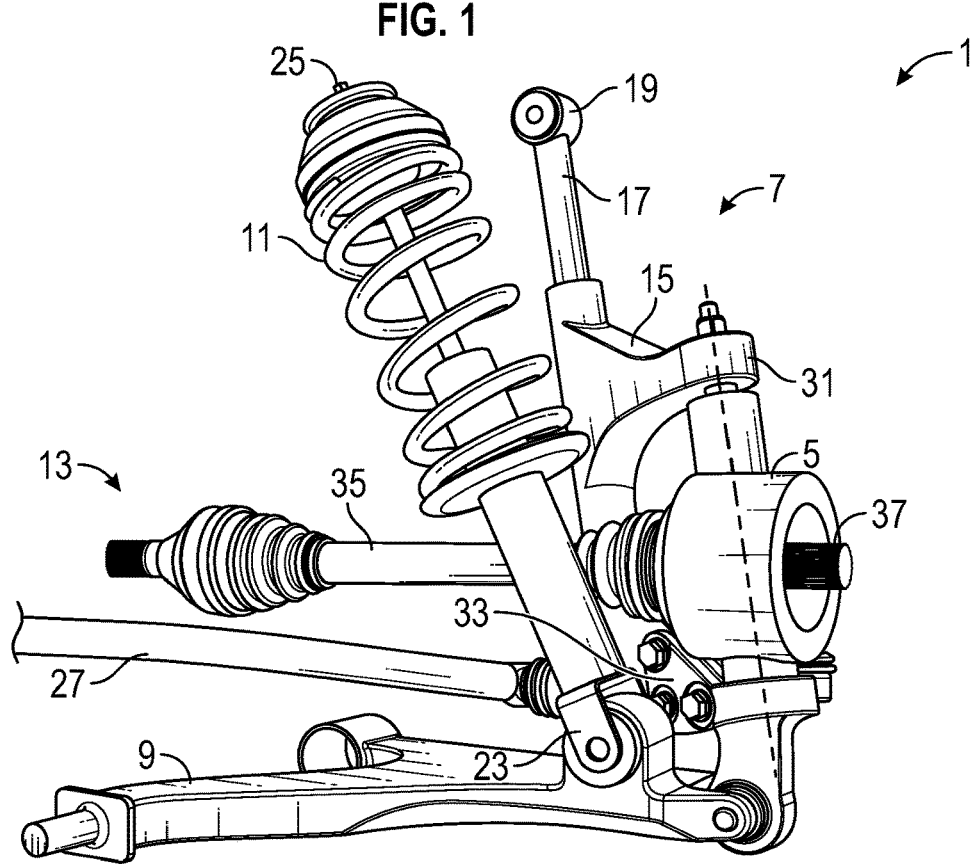
FIG. 2 is a perspective, isolated view of a compact vehicle suspension system.

Referring to FIG. 1, for example, the wheel 3 is provided with a wheel hub knuckle 5. A sliding ride motion guide 7 comprises a fixed guide portion 15 and a telescoping guide portion 17 which moves in a telescoping manner in relation to the fixed guide portion 15. The fixed guide portion 15 comprises arms 31, 33 adjacent its longitudinal ends. The arms 31, 33 connect the fixed guide portion 15 to the wheel hub knuckle 5. This connection allows the fixed guide portion 15 to span the wheel hub knuckle 5. The end of the telescoping guide portion 17 protruding from the fixed guide portion 15 is provided with a top mount 19 which structurally attaches to the vehicle body. This permits the sliding ride motion guide to bear a brake torque which results from vehicle braking and a camber torque which results from vehicle cornering thrust.

Figure 3:
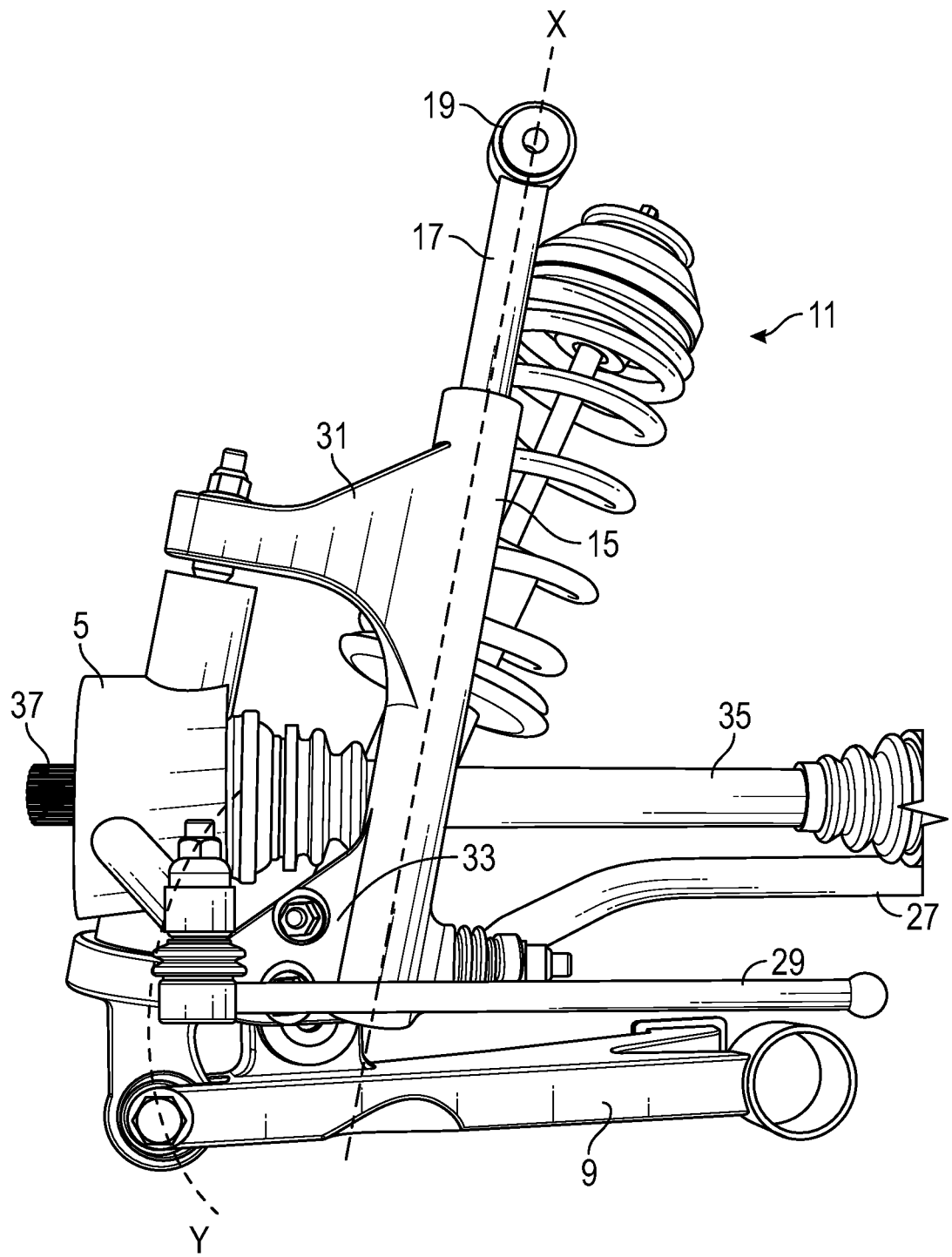
FIG. 3 is a perspective, isolated view of a compact vehicle suspension system.

A coil over shock absorber 11 provides the vehicle suspension spring and damping functions. The coil over shock absorber 11 is rotatably connected to a lower control arm 9 at a first end 23 and to the vehicle body at a second end 25 to bear the weight of the vehicle. The lower control arm 9 serves to maintain the relationship between the wheel 3 and the vehicle body in a conventional way. As illustrated in FIG. 3, the sliding ride motion guide 7 reciprocates along an axis X while the lower control arm 9 describes an arc Y as the suspension system moves while encountering road variations, turning, steering and the like. Vertical motion of the wheel 3 is defined by sliding axis X of the sliding ride motion guide 7 and the arc Y of the lower control arm 9.

Figure 4B:
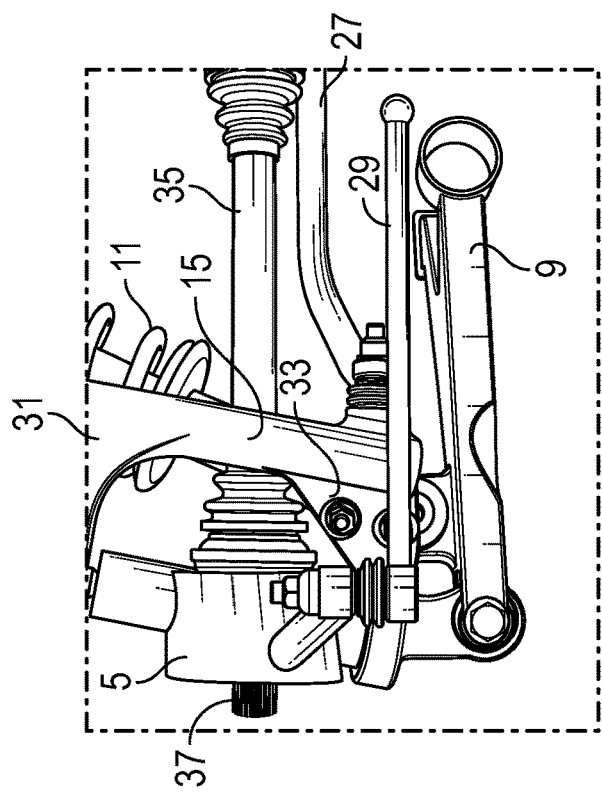
FIG. 4B is a perspective, isolated view of a portion of a compact vehicle suspension system.
Figure 4A:
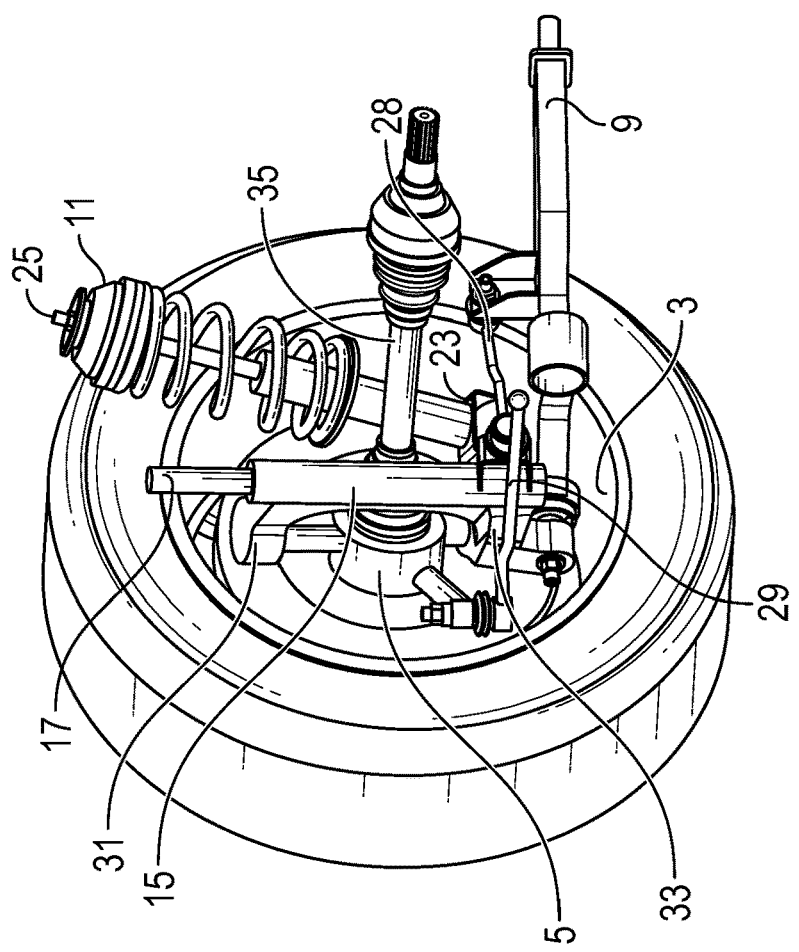
FIG. 4A is a perspective view of a compact vehicle suspension system mounted to a wheel.

The compact suspension system 1 further comprises means to control rotation of the sliding ride motion guide about a rotational axis. These means to control rotation include a suspension assembly 13. The suspension assembly 13 comprises an anti-roll bar 27 connected to the fixed guide portion 15 of the sliding ride motion guide 7. The anti-roll bar 27 controls rotation of the ride motion guide 7 as well as controlling vehicle roll in the front wheel configuration. As an alternative to the anti-roll bar 27, a link 28 may connect the lower control arm 9 to the fixed guide portion 15 to provide anti-rotation functionality, as illustrated in FIG. 4A and FIG. 6. The suspension assembly 13 may further comprise a rear tie rod 39 connected to the wheel hub knuckle 5 and the vehicle body rather than to the steering rack, as illustrated in FIGS. 6 and 8B. A drive shaft 35 is connected to the wheel hub knuckle 5 to connect the wheel 3 to the vehicle power train. A spindle 37 extends from the side of the wheel hub knuckle 5 opposite the drive shaft 35.

The compact vehicle suspension system 1 described herein has numerous advantages. Steering geometry is determined by the pivot axis of the steered wheel hub knuckle 5. This configuration provides a short spindle length which avoids torque steer while providing a favourable scrub radius for stable braking on uneven surfaces and favourable caster which aids cornering power and on-centre feel. Brake torque and camber torque resulting from cornering thrust are managed by the fixed guide portion 15 and the telescoping guide portion 17 in a manner analogous to the effect of a MacPherson strut. The fixed guide portion 15 preferably has a robust span across the steered wheel hub knuckle 5 for good brake and camber stiffness and the telescoping guide portion 17 preferably has a robust span within the fixed guide portion 15 to transmit these loads to the vehicle body structure via the top mount 19.

Figure 7A:
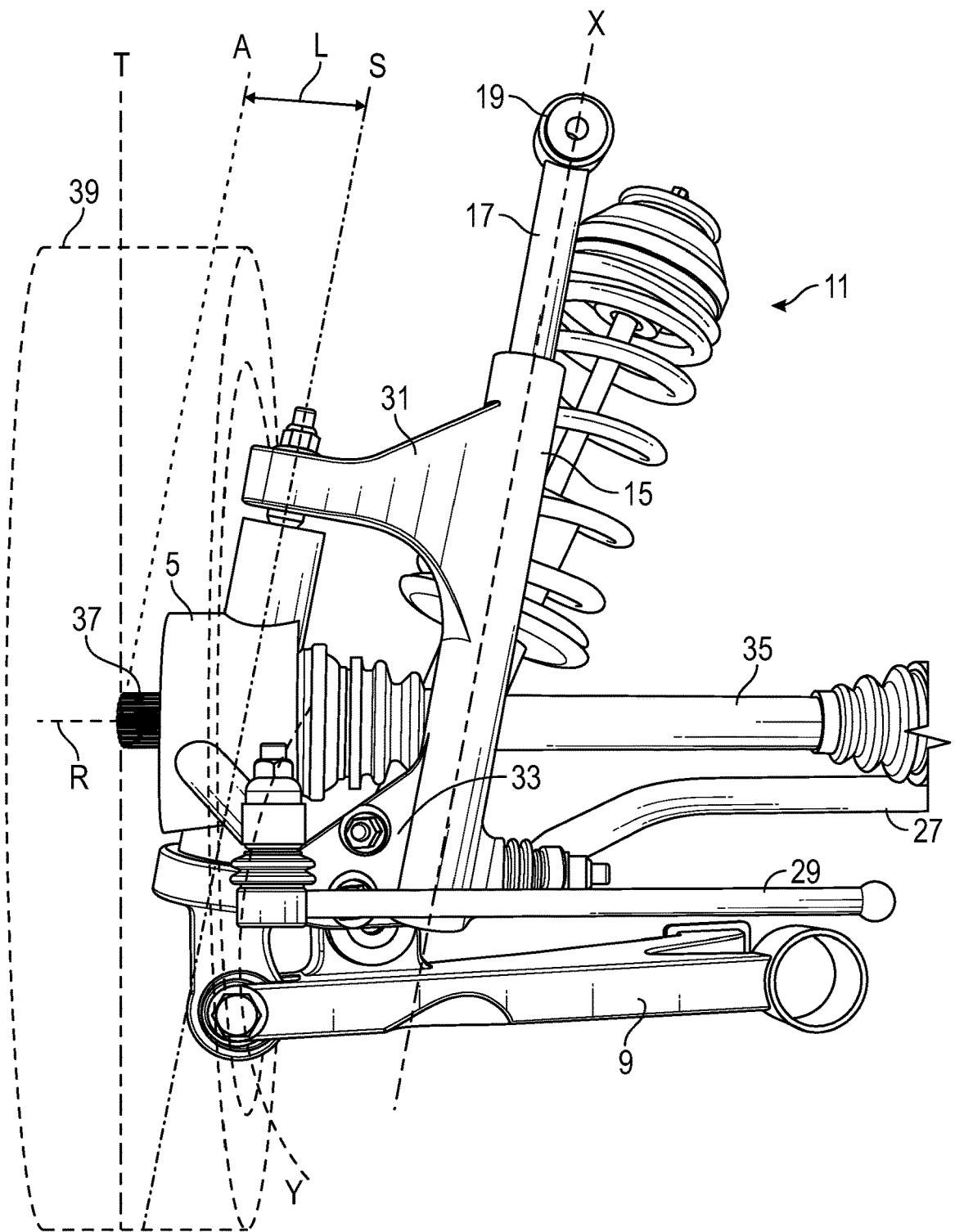
FIG. 7A is an elevation view of a compact vehicle suspension system.
Figure 7B:
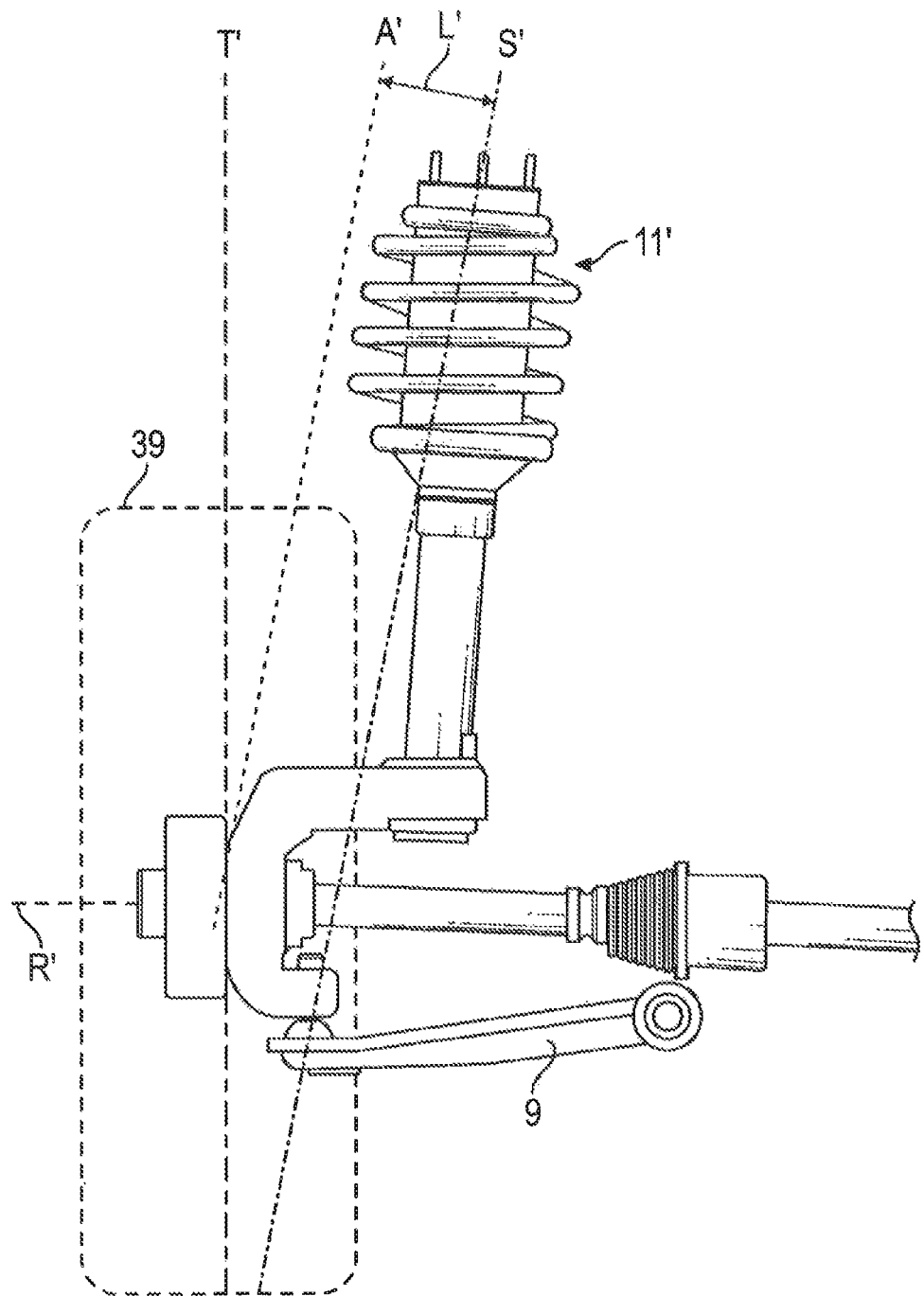
FIG. 7B is an elevation view of a MacPherson strut suspension system.

FIG. 7A illustrates a compact vehicle suspension system and a suspension and wheel system as described herein mounted to a tire 39. This may be compared to a conventional MacPherson strut suspension system mounted to a tire, as illustrated in FIG. 7B. The compact vehicle suspension system and suspension and wheel system of FIG. 7A reduces torque steer. Torque steer is related to scrub radius which relates to the tire centerline, the steering axis and the spindle length. Scrub radius, in turn, is related to spindle length.

Referring to FIG. 7B, the steering axis S' runs from the connection of the coil over shock absorber 11' to the vehicle body through the connection of the MacPherson strut to the lower control arm 9 through the base of the tire 39. The distance between the steering axis S' and the tire centerline T' at the contact surface of the tire and the road, or the scrub patch, is known as the scrub radius. The greater the scrub radius, the greater the torque steer which affects both vehicle control and tire wear. A line A' drawn from the junction of the tire rotational axis R' and the tire centerline T' parallel to the steering axis S' is used to define spindle length L'. Spindle length L' is the distance between the line A' and the steering axis S'. The spindle length L' determines the scrub radius, as previously discussed.

FIG. 7A illustrates that the steering axis S of the compact suspension system 1 is closer to the tire centerline T at the contact patch than is the steering axis S', of FIG. 7B, to the tire centerline T'. Thus, the steering axis S is closer to the tire centerline T at the base of the tire in contact with a road surface and spindle length L is shorter in the compact vehicle suspension system of FIG. 7A. This results in a smaller scrub radius with greater control during steering and reduced tire wear.

A compact vehicle suspension system for a rear wheel is illustrated in FIG. 6. The system is simpler than a typical front wheel mounted suspension system since a separate wheel hub knuckle is not required. The fixed guide portion 15 does not require an arm 31 since the fixed guide portion 15 does not span a wheel hub knuckle. Rather, the wheel hub knuckle is integral with the fixed guide portion 15. A link 28 connects a portion of the fixed guide portion 15 adjacent the exposed telescoping guide portion 17 to the anti-roll bar 27. The coil over shock absorber 11 is rotatably connected at end 23 to the lower control arm 9, and structurally connected to the body at end 25, as with the front wheel mounted compact suspension system. The rear tie rod 39 controls rotation of the sliding ride motion guide 7 in this configuration. The sliding ride motion guide 7 is directly rotationally connected to the rear wheel 3 to keep the rear wheel aligned. The anti-roll bar 27 must move with the suspension system 1 to control vehicle roll. This configuration exhibits multi-link suspension characteristics with wheel centre recession combined with roll understeer. It offers an alternative packaging and shape configuration to existing suspension designs and may be more suitable to certain vehicle layouts.

Figure 8A:
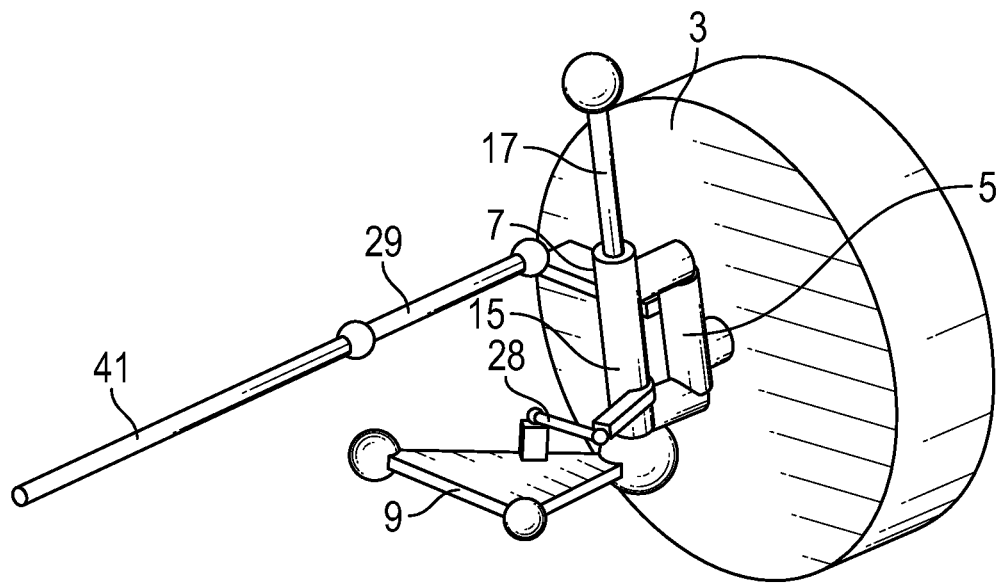
FIG. 8A schematically illustrates a front compact vehicle suspension system.
Figure 8B:
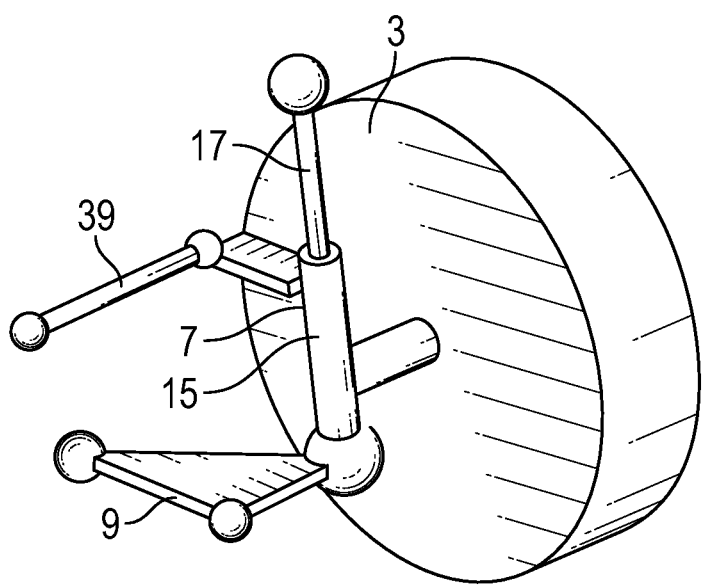
FIG. 8B schematically illustrates a rear compact vehicle suspension system.

FIGS. 8A and 8B schematically illustrate different ways in which the front and rear compact suspension system may be connected. The terminal spheres on various components indicate connections to the vehicle body.

FIG. 8A schematically illustrates a front compact suspension system with the fixed guide portion 15 of the sliding ride motion guide 7 fixedly mounted across the wheel hub knuckle 5 and rotationally mounted to the lower control arm 9. The telescoping guide portion 17 is mounted to the vehicle body. The control arm 9 is also mounted to the vehicle body. On a front-wheel drive vehicle, the wheel hub knuckle is connected to the drive train. The wheel hub knuckle 5 is also connected to the steering rack 41 via tie rod 29. A link 28 is fixed at one end to the fixed guide portion 15 and at the other end to the lower control arm 9. Alternatively, the fixed guide portion 15 may be oriented in relation to the vehicle body via an anti-roll bar 27 (not illustrated here).

FIG. 8B schematically illustrates a rear compact suspension system. The rear wheel hub knuckle is integral with the fixed guide portion 15. The fixed guide portion 15 is connected to the body via the rear tie rod 39 which orients the sliding ride motion guide 7 in relation to the vehicle body. The telescoping guide portion 17 is also mounted to the vehicle body. The lower control arm 9 is rotatably mounted to the fixed guide portion 15 at one side and to the vehicle body at the other side. The relationship of the sliding ride motion guide 7 to the vehicle body is not determined by the lower control arm 9.

The compact vehicle suspension system and suspension and wheel system provide a comprehensive, capable and flexible design which can be scaled to suit different vehicles. It has both front and rear suspension applications. It provides for compact, and in particular, low height design while delivering competitive vertical articulation. The steered axle delivers competitive steer articulation and Ackermann correction. It provides for a driveshaft where required and accommodates conventional wheel sizes, brakes, wheel bearings and steering systems. It provides the stiffness and compliances expected for contemporary motor vehicles.

Other means to create the same result within the context of this invention will be apparent to those skilled in the art.

It should be understood that although particular component arrangements are disclosed in the illustrated embodiments, other arrangements will benefit from this invention.

Although example embodiments have been disclosed, a worker of ordinary skill in this art would recognize that certain modifications would come within the scope of the claims. For that reason, the following claims should be studied to determine their true scope and content.

The invention claimed is:

1. A compact vehicle suspension system comprising:
   a sliding ride motion guide, a lower control arm, and means to control rotation of the sliding ride motion guide about a sliding and rotational axis;
   the sliding ride motion guide comprising a fixed guide portion and a telescoping guide portion which moves in a telescoping manner along the sliding and rotational axis in relation to the fixed guide portion;
   a coil over shock absorber independently oriented in relation to the sliding ride motion guide and rotatably connected to the lower control arm at a first end and to a vehicle body at a second end to bear a weight of a vehicle;
   wherein the sliding ride motion guide is adapted to be fixed to a wheel hub knuckle via the fixed guide portion and to be rotatably and structurally fixed via the telescoping guide portion at a top mount to the vehicle body to bear a brake torque and a camber torque resulting from a vehicle cornering thrust.

2. The compact vehicle suspension system of claim 1, wherein the means to control rotation of the sliding ride motion guide about the sliding and rotational axis comprises an anti-roll bar connected to the fixed guide portion of the sliding ride motion guide and to the vehicle body.

3. The compact vehicle suspension system of claim 1, wherein the means to control rotation of the sliding ride motion guide about the sliding and rotational axis comprises a link connected to the fixed guide portion of the sliding ride motion guide and to the lower control arm.

4. The compact vehicle suspension system of claim 1, wherein the means to control rotation of the sliding ride motion guide about the sliding and rotational axis comprises a link connected to the fixed guide portion of the sliding ride motion guide and to the vehicle body.

5. The compact vehicle suspension system of claim 1, wherein arms of the fixed guide portion of the sliding ride motion guide span the wheel hub knuckle.

6. The compact vehicle suspension system of claim 1, wherein the wheel hub knuckle is integral with the sliding ride motion guide.

7. The compact vehicle suspension system of claim 1, wherein vertical motion of a wheel is defined by the sliding and rotational axis of the sliding ride motion guide and an arc of the lower control arm.

8. The compact vehicle suspension system of claim 1, wherein the coil over shock absorber and the sliding ride motion guide are in non-parallel relationship to one another.

9. The compact vehicle suspension system of claim 8, wherein the coil over shock absorber has a coil over axis, the coil over axis and the sliding and rotational axis intersect one another in a lateral direction of the vehicle.

10. The compact vehicle suspension system of claim 8, wherein one of the top mount and the second end is arranged forward of the other of the top mount and the second end with respect to a longitudinal direction of the vehicle.

11. A compact vehicle suspension and wheel system of claim 1, further comprising a wheel and a wheel hub knuckle.

12. The compact vehicle suspension and wheel system of claim 11, wherein the means to control rotation of the sliding ride motion guide about the sliding and rotational axis comprises an anti-roll bar connected to the fixed guide portion of the sliding ride motion guide and to the vehicle body.

13. The compact vehicle suspension and wheel system of claim 11, wherein the means to control rotation of the sliding ride motion guide about the sliding and rotational axis comprises a link connected to the fixed guide portion of the sliding ride motion guide and to the lower control arm.

14. The compact vehicle suspension and wheel system of claim 11, wherein the means to control rotation of the sliding ride motion guide about the sliding and rotational axis comprises a link connected to the fixed guide portion of the sliding ride motion guide and to the vehicle body.

15. The compact vehicle suspension and wheel system of claim 11, wherein arms of the fixed guide portion of the sliding ride motion guide span the wheel hub knuckle.

16. The compact vehicle suspension and wheel system of claim 11, wherein the wheel hub knuckle is integral with the sliding ride motion guide.

17. The compact vehicle suspension and wheel system of claim 11, wherein vertical motion of the wheel is defined by the sliding and rotational axis of the sliding ride motion guide and an arc of the lower control arm.

18. The compact vehicle suspension and wheel system of claim 11, wherein the coil over shock absorber and the sliding ride motion guide are in non-parallel relationship to one another.

19. The compact vehicle suspension and wheel system of claim 18, wherein the coil over shock absorber has a coil over axis, the coil over axis and the sliding and rotational axis intersect one another in a lateral direction of the vehicle.

20. The compact vehicle suspension and wheel system of claim 18, wherein one of the top mount and the second end is arranged forward of the other of the top mount and the second end with respect to a longitudinal direction of the vehicle.

* * * * *